United States Patent
Brockmann et al.

(10) Patent No.: US 7,695,624 B2
(45) Date of Patent: Apr. 13, 2010

(54) METHOD AND SYSTEM FOR TREATING WATER AND UTILIZING A MEMBRANE FILTERING SYSTEM

(75) Inventors: Martin Brockmann, Lengerich (DE); Heribert Moeslang, Meerbusch (DE); Dietmar Schnuell, Meerbusch (DE); Hong Zhao, Raleigh, NC (US); David Thaure, Joinville le Pont (FR); Pierre Girodet, Le Perreux sur Marne (FR)

(73) Assignee: OTV SA, Saint Maurice Cedex (FR)

( * ) Notice: Subject to any disclaimer, the term of this patent is extended or adjusted under 35 U.S.C. 154(b) by 115 days.

(21) Appl. No.: 12/135,394

(22) Filed: Jun. 9, 2008

(65) Prior Publication Data
US 2009/0301963 A1  Dec. 10, 2009

(51) Int. Cl.
C02F 3/00 (2006.01)

(52) U.S. Cl. .................... 210/622; 210/629; 210/195.2; 210/196

(58) Field of Classification Search .................. 210/622, 210/629, 195.2, 196
See application file for complete search history.

(56) References Cited

U.S. PATENT DOCUMENTS

| | | | |
|---|---|---|---|
| 4,610,792 A | 9/1986 | Van Gils et al. | |
| 4,937,196 A | 6/1990 | Wrasidlo et al. | |
| 5,232,593 A | 8/1993 | Pedersen et al. | |
| 5,254,253 A | 10/1993 | Behmann | |
| 5,494,577 A | 2/1996 | Rekers | |
| 5,549,829 A | 8/1996 | Le | |
| 5,647,988 A | 7/1997 | Kawanishi et al. | |
| 5,726,118 A | 3/1998 | Ivey et al. | |
| 6,007,712 A | 12/1999 | Tanaka et al. | |
| 6,361,695 B1 | 3/2002 | Husain et al. | |
| 6,517,723 B1 | 2/2003 | Daigger et al. | |

(Continued)

Primary Examiner—Chester T Barry
(74) Attorney, Agent, or Firm—Coats & Bennett, P.L.L.C.

(57) ABSTRACT

A method and system is provided for treating wastewater. In one process, wastewater is directed into a treatment tank and biologically treated. The biologically treated wastewater is directed as mixed liquor from the treatment tank to a bottom portion of a downstream filtration tank having at least one submerged membrane module that extends across substantially the entire cross sectional area of the filtration tank mixed liquor is directed from the bottom of the filtration tank upwardly into the membrane module such that substantially all of the mixed liquor received in the bottom of the filtration tank flows through the membrane module. As the mixed liquor flows vertically through the membrane module, the method includes inducing at least some of the mixed liquor through walls of one or more membrane filters that form a part of the membrane module, producing a permeate stream. The remaining mixed liquor passing through and from the membrane module is referred to as a non-permeate stream and the non-permeate stream, or at least a substantial portion thereof, is recirculated to the treatment tank. The filtration tank is sized relative to the membrane module and the process is carried out such that there is no substantial recycle of mixed liquor in the filtration tank itself. Although mixed liquor may be recirculated from the filtration tank back to the treatment tank and then back to the filtration tank and so forth and so on, once the mixed liquor in the filtration tank makes one pass through the membrane module the mixed liquor is recycled back to the treatment tank and generally not permitted to be recycled back through the membrane module without first returning to the treatment tank.

21 Claims, 3 Drawing Sheets

U.S. PATENT DOCUMENTS

| | | |
|---|---|---|
| 6,752,921 B1 | 6/2004 | Kulick, III |
| 6,805,806 B2 | 10/2004 | Arnaud |
| 6,863,818 B2 | 3/2005 | Daigger et al. |
| 6,893,568 B1 | 5/2005 | Janson et al. |
| 6,946,073 B2 | 9/2005 | Daigger et al. |
| 6,982,037 B2 | 1/2006 | Horng et al. |
| 7,045,063 B2 | 5/2006 | Zhang et al. |
| 7,052,610 B2 | 5/2006 | Janson et al. |
| 7,118,672 B2 | 10/2006 | Husain et al. |
| 7,135,115 B2 | 11/2006 | Langlais et al. |
| 7,169,295 B2 | 1/2007 | Husain et al. |
| 7,175,763 B2 | 2/2007 | Husain et al. |
| 2003/0159988 A1 | 8/2003 | Daigger et al. |
| 2005/0045557 A1 | 3/2005 | Daigger et al. |
| 2006/0037909 A1 | 2/2006 | Langlais et al. |
| 2007/0163959 A1 | 7/2007 | Cote et al. |
| 2008/0017578 A1 | 1/2008 | Childs et al. |
| 2008/0093299 A1 | 4/2008 | Mahendran et al. |

METHOD AND SYSTEM FOR TREATING WATER AND UTILIZING A MEMBRANE FILTERING SYSTEM

FIELD OF THE INVENTION

The present invention relates to wastewater treatment, and more particularly, to a wastewater treatment process that utilizes membrane filtration.

BACKGROUND OF THE INVENTION

In recent years, membrane bioreactors have become popular for treating wastewater. Membrane bioreactors combine biological treatment processes with membrane filtration to generally provide an advanced level of organic and suspended solids removal. These systems typically provide an advanced level of nutrient removal. Such membranes typically have porosities ranging from about 0.035 microns to 0.4 microns. This level of filtration provides high quality effluent to be transported through the membranes and generally eliminates the sedimentation and filtration processes typically used for wastewater treatment. Because the need for sedimentation is eliminated, the biological process can operate at much higher mixed liquor suspended solids concentrations. This can reduce the size of tanks required to carry out wastewater treatment.

One type of system includes at least one biological reactor and a membrane filtration tank disposed downstream from the reactor. A membrane module or cassette is typically submerged in the filtration tank. Mixed liquor is transferred from the reactor to the downstream filtration tank. The membrane module or cassette typically includes an array of submerged individual membrane filters. Mixed liquor is induced into the open space between the individual membrane filters, resulting in the mixed liquor being filtered and producing a permeate. The permeate is pumped or is flowing by gravity from the individual membrane filters and the filtration tank.

Typically the filtration tank is relatively large compared to the size of the membrane modules or cassettes. This means that when the membrane module or cassette is placed in the filtration tank, it is surrounded by mixed liquor or non-permeated mixed liquor. The term "non-permeated mixed liquor" means mixed liquor in the filtration tank that has passed through the membrane module or modules in the filtration tank. Practically, the non-permeated mixed liquor in the filtration tank tends to be recirculated multiple times through the membrane module or cassette. That is, the mixed liquor or non-permeated mixed liquor tends to move upwardly through the membrane module and exits the top of the module and then returns downwardly outside of the module, and then is induced back upwardly through the membrane module.

Typically, an air diffuser is disposed below the membrane module or cassette. The air diffuser tends to accelerate the non-permeated mixed liquor upwardly through the membrane module. The air bubbles created by the air being diffused gives rise to an air-lift effect within the membrane module or cassette. The air bubbles, after exiting the membrane module, tend to move upward in the direction of the water surface in the filtration tank while the non-permeated mixed liquor tends to turn and move downwardly in the opposite direction. The non-permeated mixed liquor is now flowing mainly outside of the membrane module towards the bottom of the filtration tank. In some cases, the non-permeated mixed liquor exiting the top of the membrane module has a velocity that is relatively high. When the velocity of the water exiting the top of the module is relatively high, the non-permeated mixed liquor tends to retain the air bubble and does not release the air bubbles to move to the top of the water surface in the filtration tank. The entrapped air bubbles reduce the velocity of the down flowing non-permeated mixed liquor, and by doing so the volume of the mixed liquor flowing upwardly through the membrane module is limited. This reduces the turbulence of the mixed liquor passing through the membrane module and tends to reduce finally the efficiency of filtration. Typically a portion of the non-permeated mixed liquor is coming from the treatment tank and another portion is flowing back into the treatment tank. This limits the increase of the mixed liquor suspended solids in the filtration tank.

Further, in these types of membrane filtration systems, it is seen that the footprint of the filtration tank is substantially greater than the footprint of the membrane module or cassette. This, of course, can increase capital costs and other process related costs.

SUMMARY OF THE INVENTION

A method of treating wastewater where wastewater influent is directed into a treatment tank and treated. From the treatment tank the mixed liquor is directed to a filtration tank having at least one membrane module disposed therein. The filtration tank includes a surrounding wall structure, and the membrane module and the filtration tank are relatively sized such that substantially all of the mixed liquor passing through the filtration tank is constrained to move through or into the membrane module. A portion of the mixed liquor passing into the membrane module is filtered by an array of membrane filters that comprise the membrane module to form a permeate stream. The remaining portion of the mixed liquor passes from the membrane module and is recirculated back to the treatment tank. The spacing of the membrane module relative to the surrounding wall structure of the filtration tank prevents substantial recycling of mixed liquor within the filtration tank itself.

Other objects and advantages of the present invention will become apparent and obvious from a study of the following description and the accompanying drawings which are merely illustrative of such invention.

DESCRIPTION OF THE INVENTION

Figure 1:
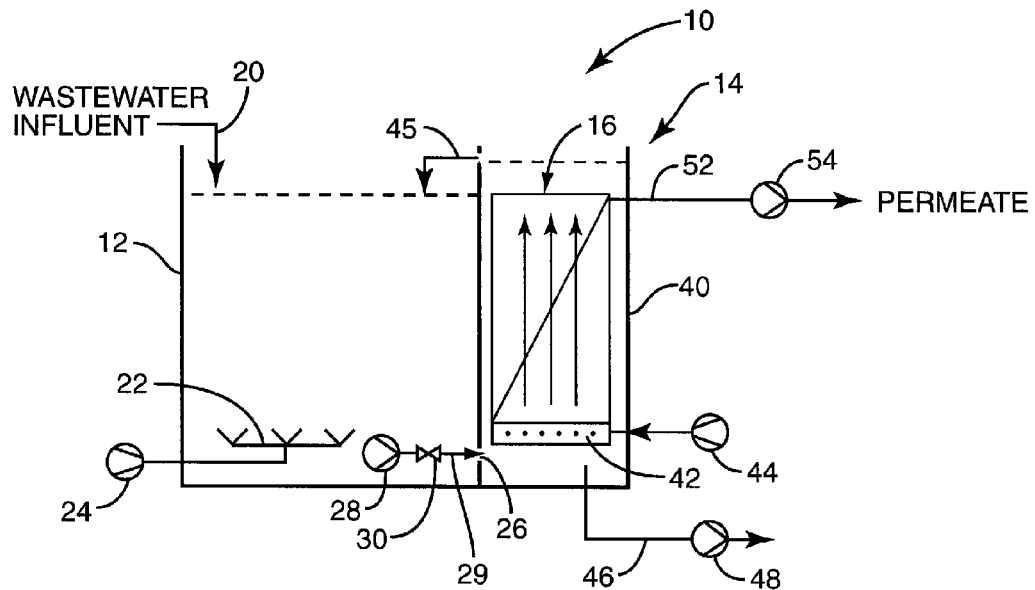
FIG. 1 is a schematic illustration of a membrane bioreactor.

With further reference to the drawings, a wastewater treatment system is shown therein and indicated generally by the numeral 10. In the embodiment illustrated herein, the wastewater treatment system is a membrane bioreactor and is used to treat various types of water and wastewater. As will be appreciated from subsequent portions of the disclosure, the wastewater treatment system disclosed herein is a membrane bioreactor which biologically treats wastewater. The biological treatment can include anaerobic, anoxic or aerobic treatment and may be directed at numerous types of treatment including, for example, nitrification-denitrification, removal of phosphorus or other nutrients, or BOD removal, etc.

Viewing wastewater treatment system 10 in more detail, the same includes a treatment tank 12. In the embodiment illustrated in FIG. 1, the wastewater treatment system includes a filtration tank indicated generally by the numeral 14, which is located downstream from the treatment tank 12. Disposed within the filtration tank 14 is one or more submerged membrane modules or cassettes indicated generally by the numeral 16. Generally, wastewater treated in the treatment tank 12 is directed in the form of mixed liquor from the treatment tank 12 to the filtration tank 14. In the filtration tank 14, the mixed liquor is filtered by the submerged membrane module 16 and the filtered mixed liquor results in a permeate that is removed from the membrane module 16 and from the filtration tank 14. As discussed below, not all of the mixed liquor passing through the filtration tank 14 is filtered. This mixed liquor is sometimes referred to as non-permeated mixed liquor. The non-permeated mixed liquor is returned or recirculated back to the treatment tank 12 for further treatment.

Turning now to a discussion of the treatment tank 12, note in the drawings where there is provided a wastewater influent line 20 that is directed to the treatment tank 12. Wastewater is directed through influent line 20 into the tank for treatment. Typically, biological treatment utilizes air. Hence there is provided an air diffuser 22 disposed within treatment tank 12 and a blower 24 that is operative to generate a system of air that is diffused from air diffuser 22 into the wastewater contained in the treatment tank 12. Aeration is needed for some biological degradation, while it may be switched off for other biological processes.

Figure 3:
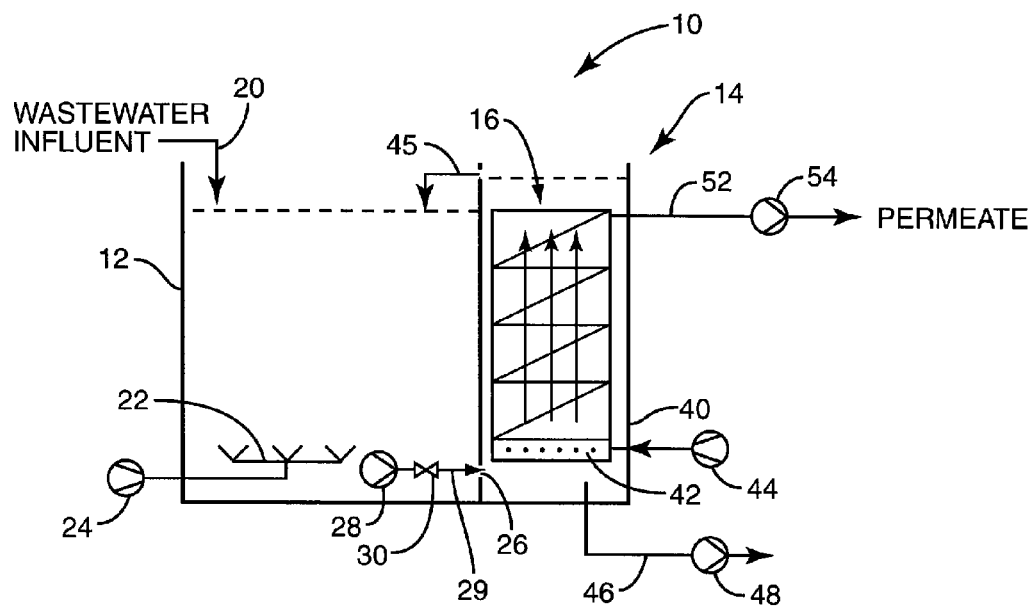
FIG. 3 is an alternative membrane bioreactor where the filtration tank includes a plurality of stacked membrane modules.

Treatment tank 12 includes an outlet 26. In the case of the embodiment shown in FIG. 1, outlet 26 happens to be formed in a wall or in a pair of walls that separates treatment tank 12 from the filtration tank 14. In this case, outlet 26 is formed in the separating wall or walls such that mixed liquor is transferred from the treatment tank 12 into the lower portion of the filtration tank 14. A pump 28 or the air lift pump induced by operating diffuser 42 is provided to pump mixed liquor from the treatment tank 12 into the filtration tank 14. A valve 30 is provided downstream of the pump 28 and a feed line 29 interconnects the valve with the outlet 26. This, as seen in FIGS. 1 and 3, mixed liquor in tank 12 is pumped via pump 28 through valve 30 into feed line 29 that connects with outlet 26. This effectively transfers mixed liquor from the treatment tank 12 into the bottom portion of the filtration tank 14.

Turning to filtration tank 14, the filtration tank includes a surrounding wall structure 40. The shape and size of the filtration tank and the surrounding wall structure 40 can vary. In some embodiments the surrounding wall structure is square or rectangular in cross section. The wall structure can be built jointly together with treatment tank 12 or it can be a separate construction In some embodiments, disposed in the lower portion of the filtration tank 14 is an air diffuser 42. In this case a blower 44 is operatively connected to the air diffuser 42 for generating a system of air and directing the air into and through the air diffuser 42. As those skilled in the art will appreciate, the air diffuser 42 may serve numerous functions. The air diffuser 42 may be utilized to disperse scouring air upwardly through the membrane module 16 for cleaning the individual membrane filters forming a part of the membrane module. In addition, the blower 44 along with the air diffuser 42 can assist in moving mixed liquor vertically through the filtration tank 14 and through the membrane module 16. The vertically movement of the non-permeated mixed liquor can be induced by aeration, by aeration plus pump 28 or by pump 28 alone without aeration.

Filtration tank 14 is also provided with a recirculated line 45. The non-permeated mixed liquor can flow by gravity and line 45 back into treatment tank 12.

Filtration tank 14 may also be provided with a discharge line 46. Connected to the discharge line 46 is a discharge pump 48. A valve (not shown) is typically disposed in the discharge line 46 between the filtration tank and the pump 48. This prevents the filtration tank from leaking. From time-to-time it may be advantageous to empty the filtration tank 14 in order to clean or perform maintenance on the membrane module 16 contained therein. The discharge pump 48 along with the discharge line 46 facilitates the emptying of the filtration tank 14.

As discussed above, the membrane module 16 is mounted or disposed in the filtration tank 14. Membrane module 16 basically comprises a frame structure that supports a plurality of individual membrane filters. The membrane filters are suspended and supported in the frame structure and are spaced such that the non-permeated wastewater passes by the membrane filter. The structure and type of individual membrane filters that form the membrane module 16 can vary. For example, the individual membrane filters may be of the plate type such as manufactured by Kubota Corporation, Toray, Microdyn-Nadir, A3 and others. Another type of membrane filter is the hollow fiber type such as manufactured by GE-Zenon, Koch-Puron, Mitsubishi-Hydronautics and others. The pore sizes of these individual membrane filters can vary. In some applications the pore size will range from about 0.01 to 0.4 microns and covers ultrafiltration and microfiltration. In addition, some of the membrane filters could be incorporated into a backwash system for washing and cleaning the filters periodically.

The term "membrane module" or "membrane cassette" used herein means a group or array of individual membrane filters that are grouped together or supported in a frame. In addition, it should be pointed out that the membrane module 16 as employed in the system and processes discussed is a submerged membrane module. This, of course, means that the membrane module 16 is submerged in mixed liquor in the filtration tank 14.

Each membrane module 16 is provided with a main permeate line or manifold 52. Permeate line 52 is operatively connected to a network of pipes or tubes that ultimately are communicatively linked to the interior or permeate side of the individual membrane filters. The permeate will be drawn either by gravity using a siphon effect or by pumping. A permeate pump 54 or a siphon is operatively connected to the permeate line 52 and is effective to create a vacuum in the individual permeate filters. This induces or draws mixed liquor through the walls of the individual membrane filters to produce the permeate. Thus, the permeate pump 54 or the siphon is effective to produce permeate from individual permeate filters of the membrane module 16 and ultimately to the permeate line or manifold 52, thereby removing the permeate from the filtration tank. In the embodiment illustrated in FIG. 1, there is provided one membrane module 16. Consequently, there is one permeate line 52 and one permeate pump 54. However, in FIG. 3, there is shown four separate stacked membrane modules 16 disposed in the filtration tank 14. In this case, there is provided one main permeate line and one permeate pump for all membrane modules. As an option, in the FIG. 3 embodiment, there could be provided four permeate lines and four pumps.

Figure 2:
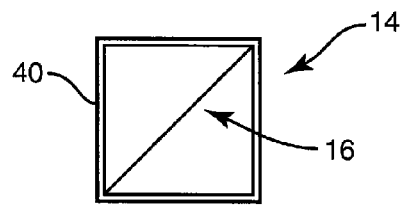
FIG. 2 is a top plan view of the filtration tank and membrane module shown in FIG. 1.

Filtration tank 14 and membrane module 16 are sized relative to each other. As seen in the drawings, particularly FIG. 2, the membrane module 16 occupies substantially the entire cross sectional area of the filtration tank 14. That is, the surrounding wall 40 of the filtration tank 14 is spaced closely adjacent the frame of the membrane module 16. The objective is to size the filtration tank 14 such that it extends substantially entirely across the flow of the membrane module 16. That is, the filtration tank is sized such that when the membrane module 16 is placed within the filtration tank, that substantially the entire flow path of mixed liquor passing through the filtration tank will pass into and through the membrane module. During the filtration process, mixed liquor is pumped vertically through the membrane module 16. The spacing of the filtration tank 14 with respect to the membrane module 16 assures that substantially all of the mixed liquor must flow into and through the membrane module 16. The positioning of the membrane module 16 and the spacing of the filtration tank 14 is designed to minimize mixed liquor bypassing the membrane module 16 and the individual membrane filters contained therein.

Thus, the system and process prevents substantial downflow of non-permeated mixed liquor through the filtration tank 14 and the membrane module 16 therein. That is, once the non-permeated mixed liquor moves through the membrane module 16, the system dictates that most, or substantially all, of the non-permeated mixed liquor be recirculated to the treatment tank 12 and not be permitted to flow back downwardly through the filtration tank 14 and membrane module 16 before being recirculated to the treatment tank. Thus, the downflow of non-permeated mixed liquor is limited. In a preferred process, the downflow of the non-permeated mixed liquor is 20% or less than the incoming mixed liquor flow to the filtration tank 14.

In one embodiment, the membrane module 16 includes hollow fiber membrane filters. These hollow fiber membrane filters are sometimes referred to as out-to-in membrane filters. This is because the mixed liquor that is filtered moves from an area outside of the hollow fiber membrane filters through a wall thereof and into an interior area within the hollow fibers. The portion of the mixed liquor that is filtered and ends up inside the hollow fiber is the permeate. The permeate pump 54 is effective to create a vacuum or a low pressure area in the various hollow fiber membrane filters. This induces a portion of the mixed liquor into the interior areas of the hollow fiber membrane filters.

Not all of the mixed liquor passing vertically through the membrane module 16 is filtered. Some of the mixed liquor exits the membrane module 16 without being filtered. Mixed liquor in the filtration tank 14 that has passed through the membrane module 16 without being filtered is referred to as non-permeate or non-permeated mixed liquor.

The non-permeated mixed liquor exiting the membrane module 16 is recirculated to the treatment tank 12. Various provisions can be made for recycling non-permeated mixed liquor to the treatment tank 12. For example, non-permeated mixed liquor in the filtration tank 14 may flow thorough an opening in the intervening wall separating the filtration tank from the treatment tank. Alternatively an opening may be provided in the intervening wall above the membrane module 16 such that non-permeated mixed liquor will flow from the filtration tank 14 back to the treatment tank 12. The amount of non-permeated mixed liquor recirculated to the treatment tank 12 can vary. However, in one embodiment, the ratio of non-permeated mixed liquor recirculated to the treatment tank to the permeate is approximately 2-100 to 1. That is, approximately 50-99% of the mixed liquor pumped or moved through the filtration tank 14 is recirculated to the treatment tank 12 while approximately 1-50% of the mixed liquor passing through the filtration tank 14 is captured as permeate. The flow of influent wastewater into the treatment tank would generally, on average, be equal to the flow of permeate from the filtration tank 14. A minor portion of the mixed liquor is withdrawn as excess sludge.

The membrane modules are generally standard products. Therefore, in most cases the filtration tanks 12 are sized to accommodate the membrane modules in accordance with the system and process described above.

In the embodiment illustrated in FIG. 1, the membrane module 16 is a single module or cassette. However, the system and process of the present invention may utilize a series of stacked membrane modules 16. This embodiment is illustrated in FIG. 3. Here the membrane modules 16 are stacked one over the other. However, the same principles as discussed above apply with stacked membrane modules. That is, the stacked membrane modules 16 are sized with respect to the filtration tank 14 such that each occupies substantially the entire cross sectional area of the filtration tank 14. This assures that substantially all of the mixed liquor being pumped or moved vertically through the filtration tank 14 is constrained or required to move into or through the membrane modules 16. It follows that the non-permeated mixed liquor is constrained to move through each of the stacked membrane modules 16. The resulting permeate, on the other hand, can be found in any one of the stacked membrane modules 16. That is, some of the mixed liquor being filtered may end up as permeate prior to reaching one or more of the upper disposed membrane modules 16 of the stack.

Figure 5:
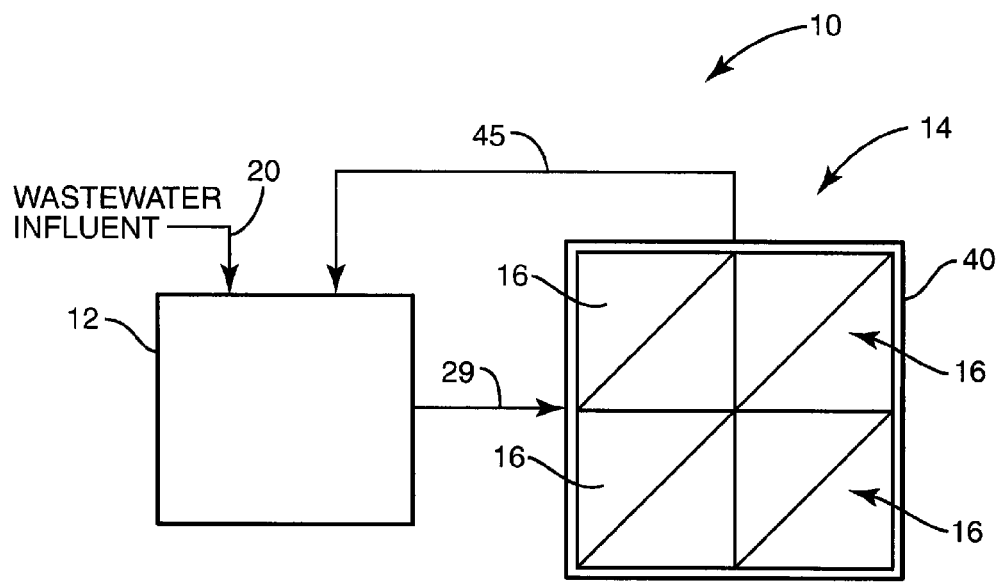
FIG. 5 is a schematic illustration showing another alternative membrane bioreactor having a multiplicity of membrane modules disposed in a filtration tank.

In some embodiments, there may be provided a multiple number of single or stacked modules in the filtration tank 14. See FIGS. 3 and 5 for example. The sizing of the filtration tank follows the criteria mentioned before. In this case the feeding pipe 29 distributes the incoming mixed liquor evenly under the stack of modules while effluent line 45 is collecting the non-permeated mixed liquor and directing it back to treatment tank 12. See FIG. 3. The permeate manifolds are connected to at least one permeate pipe 52 and a pump 54 or a siphon line. In the FIG. 5 embodiment, it is seen that the filtration tank includes four separate membrane modules 16. The four separate membrane modules 16 together occupy substantially the entire cross-sectional area of the single filtration tank 14. This is compared to the embodiment shown in FIG. 3 where there is provided four stacked membrane modules 16 that are disposed in a single filtration tank 14.

Figure 4:
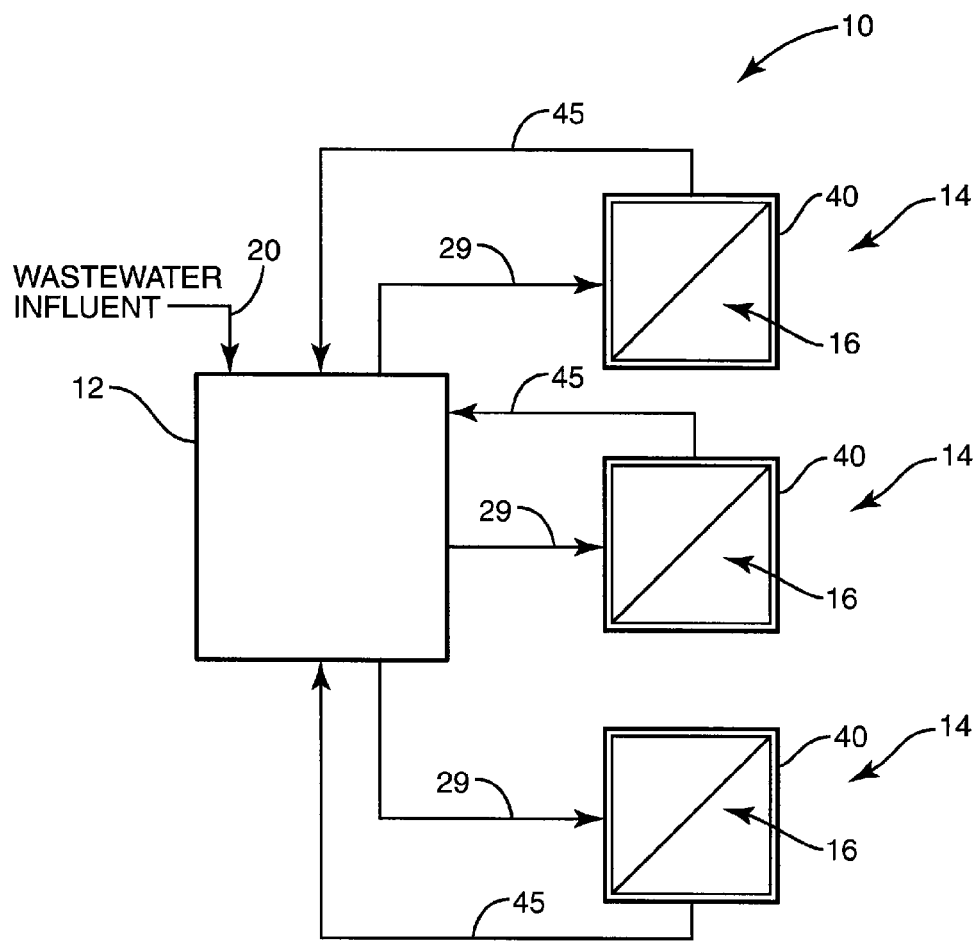
FIG. 4 is a simple schematic illustration showing an alternative membrane bioreactor having a series of filtration tanks.

In some embodiments, there may be provided multiple filtration tanks 14. See FIG. 4 for example. In this case there is provided three downstream filtration tanks 14 with each including one or more membrane module 16 or module stacks mixed liquor in the treatment tank 12 is pumped or otherwise moved from the treatment tank via feed line 29 into the filtration tanks 14 and moved vertically through the one or more membrane modules 16 contained in each filtration tank. Each filtration tank 14 includes a return line 45 for recycling non-permeated mixed liquor back to the treatment tank 12. In designs such as shown in FIG. 4, one filtration tank 14 can be completely shut down in order to clean or perform maintenance on the membrane module or modules contained therein without having to shut down the entire wastewater treatment system.

Figure 6:
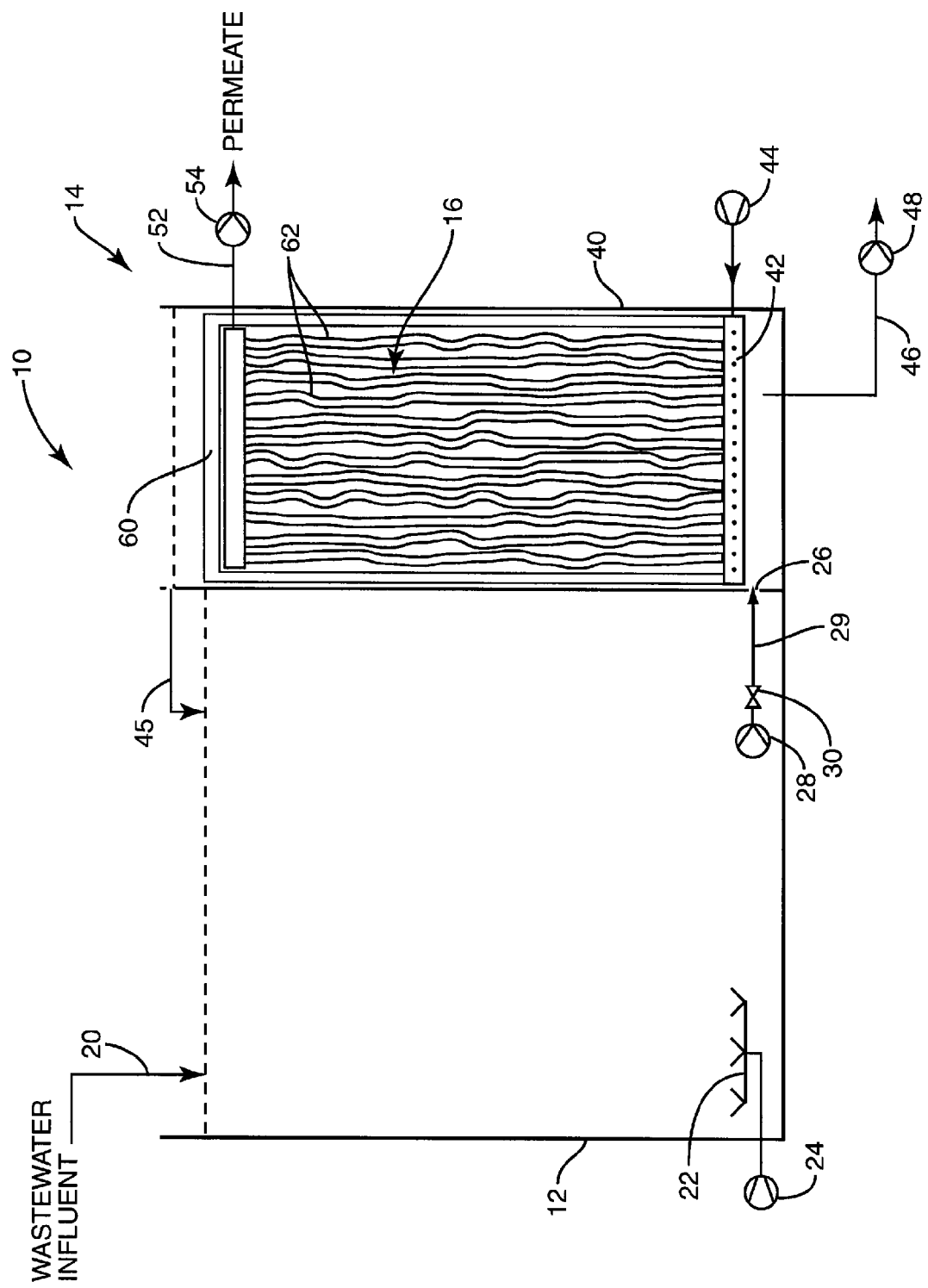
FIG. 6 is a schematic illustration of a hollow fiber type membrane module disposed in the filtration tank of the membrane bioreactor.

FIG. 6 is a schematic illustration similar to FIG. 1 but shows a certain type of membrane module. In the case of the FIG. 6 embodiment, disposed within the filtration tank 14 is a hollow fiber type membrane module 16. The membrane module 16 includes a frame structure 60 and an array of generally vertically extending hollow fiber membrane filters 62. Note that the hollow fiber membrane filters 62 extend substantially across the entire cross-sectional area of the filtration tank 14. This means, of course, that as the mixed liquor moves upwardly in the filtration tank 14, that the mixed liquor will move adjacent to the hollow fiber membrane filters 62 and some of the mixed liquor will be induced into the interior area of the hollow fiber membrane filters 62 to produce the permeate.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of biologically treating wastewater in a membrane bioreactor comprising:
   a. directing wastewater into a treatment tank and biologically treating the wastewater in the treatment tank;
   b. directing the biologically treated wastewater as mixed liquor from the treatment tank to a bottom portion of a downstream filtration tank having at least one submerged membrane module that extends across substantially the entire cross sectional area of the filtration tank;
   c. moving the mixed liquor from the bottom portion of the filtration tank upwardly through the membrane module and constraining the flow of the vertically moving mixed liquor in the filtration tank such that substantially all of the mixed liquor received in the bottom of the filtration tank enters the membrane module in the filtration tank;
   d. as the mixed liquor flows through the membrane module, inducing at least some of the mixed liquor through the walls of one or more membrane filters that form a part of the membrane module, producing a permeate stream and wherein the mixed liquor passing through the membrane module but not filtered by the membrane filters is referred as a non-permeate stream;
   e. directing the permeate stream from the one or more membrane filters of the membrane module;
   f. once the non-permeate stream has passed through the membrane module, recycling at least a portion of the non-permeate stream to the treatment tank wherein the recycled non-permeate stream constitutes at least 50% of the mixed liquor directed from the treatment tank to the filtration tank; and
   g. substantially prohibiting the recirculation of mixed liquor in the filtration tank such that substantially all of the non-permeate stream makes only a single pass through the membrane module before being recirculated to the treatment tank.

2. The method of claim 1 wherein the membrane module includes a series of out-to-in membrane filters, and wherein the mixed liquor enters the membrane filters from an outside area and passes into an interior area of the membrane filters as a permeate.

3. The method of claim 1 including recycling approximately 50-99% of the mixed liquor entering the filtration tank to the treatment tank, and discharging approximately 1-50% of the mixed liquor entering the filtration tank as permeate.

4. The method of claim 1 including maintaining the influent flow rate of wastewater to the treatment tank generally equal to the flow rate of the permeate.

5. The method of claim 4 including recycling approximately 50-99% of the flow of mixed liquor through the filtration tank back to the treatment tank.

6. The method of claim 1 including stacking a series of membrane modules one over the other in the filtration tank where each of the stacked membrane modules occupy substantially the entire cross sectional area of the filtration tank.

7. The method of claim 1 including arranging multiple stacks of modules one beneath each other in the filtration tank wherein the complete arrangement of multiple stacked modules occupy substantially the entire cross sectional area of the filtration tank.

8. The method of claim 6 including restricting the movement of the non-permeate stream so as to substantially preclude the recirculating of the non-permeate stream back through one or more of the membrane modules prior to the non-permeate stream being recirculated back to the treatment tank.

9. A method of biologically treating wastewater in a membrane bioreactor, comprising:
   a. directing an influent stream of wastewater into a biological treatment tank and biologically treating the wastewater and forming mixed liquor in the treatment tank;
   b. transferring the mixed liquor from the treatment tank to a downstream filtration tank;
   c. submerging a one or more membrane module in mixed liquor contained within the filtration tank;
   d. positioning the one or more membrane modules in the filtration tank such that the one or more membrane modules occupy substantially the entirety of the cross sectional area of the filtration tank;
   e. moving the mixed liquor in the filtration tank vertically through the filtration tank and vertically through the one or more membrane modules in the filtration tank;
   f. constraining the flow of the vertically moving mixed liquor in the filtration tank such that substantially the entire flow of vertically moving mixed liquor in the filtration tank is constrained to move through the one or more membrane modules;
   g. as the mixed liquor moves vertically through the one or more membrane modules, passing a first portion of the mixed liquor through individual membrane filters forming a part of the one or more membrane module to produce a permeate;
   h. directing the permeate from the individual membrane filters and from the filtration tank;
   i. recycling a second portion of the mixed liquor from the filtration tank to the treatment tank after the second portion of the mixed liquor has passed through the one or more membrane modules; and
   j. wherein at least 50% of the mixed liquor passing into the filtration tank is recycled to the biological treatment tank.

10. The method of claim 9 wherein biologically treating the wastewater in the treatment tank includes providing anaerobic, anoxic or aerobic treatment, and wherein the filtration tank includes a surrounding wall structure and the method includes positioning the membrane module in the filtration tank such that the surrounding wall structure of the filtration tank extends closely adjacent the outside of the membrane module such that substantially all of the mixed liquor vertically moving through the filtration tank is constrained to move into or through the membrane module.

11. The method of claim 9 including stacking a series of membrane modules one over the other in the filtration tank such that each of the stacked membrane modules occupies substantially the entire cross sectional area of the filtration tank.

12. The method of claim 9 including arranging multiple stacks of modules one beneath each other in the filtration tank wherein the complete arrangement of multiple stacked modules occupy substantially the entire cross sectional area of the filtration tank.

13. The method of claim 9 wherein the permeate produced constitutes approximately 1-50% of the flow of mixed liquor through the filtration tank; and wherein approximately 50-99% of the mixed liquor passing through the filtration tank is recirculated back to the treatment tank.

14. The method of claim 9 including pumping mixed liquor from the treatment tank into a lower portion of the filtration tank and pumping the mixed liquor in the filtration tank upwardly from the bottom through the membrane module.

15. A membrane bioreactor wastewater treatment system for treating wastewater, comprising:
  a. a wastewater treatment tank for receiving a wastewater influent and biologically treating the wastewater in the wastewater treatment tank to form mixed liquor;
  b. the biological wastewater treatment tank including a source of air for aerating the wastewater in the biological treatment tank;
  c. a filtration tank disposed down stream from the wastewater treatment tank for receiving mixed liquor treated in the wastewater treatment tank;
  d. an outlet in the wastewater treatment tank for directing mixed liquor therefrom such that mixed liquor from the wastewater treatment tank can be directed into the filtration tank;
  e. at least one submergible membrane filtration module disposed in the filtration tank for being submerged in the mixed liquor contained therein and wherein the membrane filtration module filters at least some of the mixed liquor in the filtration tank to produce a permeate;
  f. the submerged membrane module including an array of membrane filters adapted to be submerged in the mixed liquor within the filtration tank;
  g. the filtration tank and membrane module sized relative to each other such that the membrane module occupies substantially the entire cross sectional area of the filtration tank such that substantially all the mixed liquor passing through the filtration tank is constrained to move through the membrane filtration module;
  h. a permeate line operatively connected to the membrane module in the filtration tank for directing permeate from the filtration tank;
  i. a recycled outlet for recycling mixed liquor from the filtration tank to the treatment tank;
  j. wherein the membrane bioreactor wastewater treatment system is configured to recycle back to the treatment tank at least 50% of the mixed liquor directed from the treatment tank to the filtration tank; and
  k. means for pumping the mixed liquor from the wastewater treatment tank to the bottom of the filtration tank and then from the bottom of the filtration tank upwardly through the filtration tank and through the membrane module contained therein.

16. The wastewater treatment system of claim 15 wherein the means for pumping the mixed liquor from the wastewater treatment tank to the filtration tank includes a pump or an air-lift pump.

17. The wastewater treatment system of claim 15 wherein the membrane filters comprising the membrane module includes an array of out-to-in membrane filters wherein at least some of the mixed liquor passing through the membrane module passes from outside of the membrane filters, through a permeable wall forming a part of each membrane filter to an interior area thereof such that a permeate results in the interior areas of the membrane filters.

18. The wastewater treatment system of claim 15 including a series of membrane modules with the series of membrane modules being stacked one over the other in the filtration tank with each stacked membrane module occupying substantially the entire cross sectional area of the filtration tank such that mixed liquor moving through the filtration tank is constrained to move through all of the stacked membrane modules.

19. The wastewater treatment system of claim 15 including arranging multiple stacks of modules one beneath each other in the filtration tank where the complete arrangement of multiple stacked modules occupy substantially the entire cross sectional area of the filtration tank.

20. The method of claim 9 including pumping the mixed liquor from the treatment tank to the filtration tank and vertically through the filtration tank with an airlift pump.

21. The method of claim 9 including preventing no more than 20% of the non-permeated mixed liquor from flowing back downwardly through the filtration tank and the one or more membrane modules without first being recirculated to the treatment tank.

* * * * *